US007868196B2

(12) United States Patent
Lee et al.

(10) Patent No.: US 7,868,196 B2
(45) Date of Patent: Jan. 11, 2011

(54) PREPARATION OF GLYCEROL DERIVATIVES AND INTERMEDIATES THEREFOR

(75) Inventors: Tae-Suk Lee, Taejon (KR); Jin-Soo Yook, Taejon (KR); Jong-Soo Lee, Taejon (KR); Chang-Hyun Yoo, Taejon (KR); Ju-Cheol Lee, Taejon (KR); Cheol-Min Lee, Taejon (KR); Wan-Hee Lee, Seoul (KR)

(73) Assignee: Enzychem Co., Ltd. (KR)

( * ) Notice: Subject to any disclaimer, the term of this patent is extended or adjusted under 35 U.S.C. 154(b) by 407 days.

(21) Appl. No.: 11/989,074

(22) PCT Filed: Jul. 18, 2006

(86) PCT No.: PCT/KR2006/002809

§ 371 (c)(1), (2), (4) Date: Jan. 18, 2008

(87) PCT Pub. No.: WO2007/011150

PCT Pub. Date: Jan. 25, 2007

(65) Prior Publication Data

US 2009/0253923 A1 Oct. 8, 2009

(30) Foreign Application Priority Data

Jul. 20, 2005 (KR) ...................... 10-2005-0065792

(51) Int. Cl.
*C07F 9/02* (2006.01)

(52) U.S. Cl. ........................................................ 554/79

(58) Field of Classification Search .................... 554/79
See application file for complete search history.

(56) References Cited

FOREIGN PATENT DOCUMENTS

| | | | |
|---|---|---|---|
| EP | 238202 | | 4/1993 |
| JP | 62-063593 | | 3/1987 |
| KR | 10-291743 | | 11/2000 |
| KR | 10-0283010 | | 12/2000 |
| WO | WO9216639 | * | 1/1922 |

OTHER PUBLICATIONS

Burgos et al., "JA New, Asymmetric Synthesis of Lipids and Phospholipids", J. Org. Chem. 1987, 52(22), 4973-4977.*
International Search Report for PCT Application No. PCT/KR2006/002809.

* cited by examiner

*Primary Examiner*—Deborah D Carr
(74) *Attorney, Agent, or Firm*—Blakely, Sokoloff, Taylor & Zafman

(57) ABSTRACT

Disclosed is a process for the regioselective preparation of glycerol derivative in a high efficiency and yield. The process for the regioselective preparation of 1-$R_1$-2-$R_2$-3-acetyl-glycerol derivative comprises the steps of: obtaining 1-$R_1$-3-protecting group-glycerol by introducing a protecting group to 3-position of 1-$R_1$-glycerol; obtaining 1-$R_1$-2-$R_2$-3-protecting group-glycerol by introducing $R_2$ group into 2-position of 1-$R_1$-3-protecting group-glycerol; and carrying out the deprotection reaction and the acetylation reaction of 1-$R_1$-2-$R_2$-3-protecting group-glycerol at the same time. Wherein, $R_1$ and $R_2$ are fatty acid groups having 16 to 22 carbon atoms, and are different from each other; and the protecting group is trityl group or trialkylsilyl group.

16 Claims, No Drawings

PREPARATION OF GLYCEROL DERIVATIVES AND INTERMEDIATES THEREFOR

The present patent application is a national phase application of International Application No. PCT/KR2006/002809, filed Jul. 18, 2006.

TECHNICAL FIELD

This invention relates to a preparation of glycerol derivatives and intermediates therefor, and more specifically to a process for the regioselective preparation of glycerol derivatives of the following Formula 1 in a high efficiency and yield.

[Formula 1]

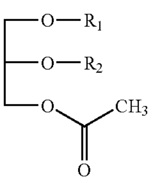

Glycerol derivatives of Formula 1 are racemic compounds or optically active compounds, wherein $R_1$ and $R_2$ are fatty acid groups having 16 to 22 carbon atoms, and are different from each other.

BACKGROUND ART 1-palmitoyl-2-linoleoyl-3-acetylglycerol (PLA), one of the compounds of Formula 1, is separated from the chloroform extracts of a deer antler, and is known as having activities for proliferation of hematopoietic stem cells and megakaryocytes (Korean Patent No. 10-0283010). As the processes for preparing the compound of Formula 1, a method of synthesizing the compound from glycerol and a method of acetolysis of phosphatidyl choline are known (Korean Patent Application No. 10-2000-0045168). However, the method of synthesizing the compound of Formula 1 from glycerol is not a regioselective process, and thus requires separation and purification steps using a column-chromatography after each reaction step. Namely, the target compound (PLA) can be obtained by the steps of separating 1-palmitoylglycerol by using a column chromatography from the reaction product of glycerol and palmitic acid, and successively esterifying the separated 1-palmitoylglycerol. The method has drawbacks that the yield is very low(about 3.21% from glycerol), and one equivalent of expensive 4-dimethylamino pyridine (DMAP) should be used for the reaction at low temperature of about 0° C. On the other hand, the acetolysis of phosphatidyl choline has the yield of about 74.5%, but expensive phosphatidyl choline should be used in a large amount for this method. Therefore, the method is not appropriate to produce the target compound in a large amount.

In order to regioselectively synthesize glycerol derivative having ester groups of different fatty acids at 1 and 2-positions of glycerol and acetyl group at 3-position of glycerol, the following process is carried out in a conventional method. First, an ester group is regioselectively introduced into 1-position of glycerol. Then, hydroxyl group of 3-position of glycerol is protected and other ester group is introduced into 2-position of glycerol. The process can regioselectively introduce ester groups into 1, 2 and 3-positions of glycerol. However, when the protecting group at 3-position is removed for introducing an ester group into 3-position of glycerol, there is a problem that the ester group of 2-position of glycerol is migrated to 3-position of glycerol (J. Org. Chem., 52(22), 4973~4977, 1987).

DISCLOSURE

Technical Problem

Accordingly, it is an object of this invention to provide a process for the regioselective preparation of glycerol derivatives, which has a good efficiency and yield.

It is other object of this invention to provide a process for the regioselective preparation of glycerol derivatives without the problem of migrating of a functional group.

It is another object of this invention to provide a simple process for the regioselective preparation of glycerol derivatives and intermediates for preparing glycerol derivatives.

Technical Solution

To achieve these and other objects, this invention provides a process for the regioselective preparation of 1-$R_1$-2-$R_2$-3-acetyl-glycerol derivative of the following Formula 1 comprising the steps of: obtaining 1-$R_1$-3-protecting group-glycerol of Formula 3 by introducing a protecting group to 3-position of 1-$R_1$-glycerol of Formula 2; obtaining 1-$R_1$-2-$R_2$-3-protecting group-glycerol of Formula 4 by introducing $R_2$ group into 2-position of 1-$R_1$-3-protecting group-glycerol of Formula 3; and carrying out the deprotection reaction and the acetylation reaction of 1-$R_1$-2-$R_2$-3-protecting group-glycerol of Formula 4 at the same time.

[Formula 1]

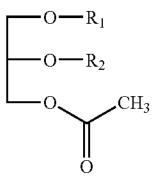

[Formula 2]

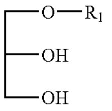

[Formula 3]

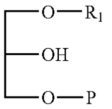

[Formula 4]

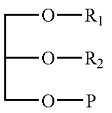

The compounds of Formula 1 to 4 are racemic compounds or optically active compounds, wherein $R_1$ and $R_2$ are fatty acid groups having 16 to 22 carbon atoms, and are different from each other, and P is trityl group or trialkylsilyl group as the protecting group. The alkyl in trialkylsilyl group is alkyl group having 1 to 5 carbon atoms This invention also provides intermediates of Formula 3 or 4 for preparing glycerol derivative of Formula 1. Preferably $R_1$ is palmitoyl group, $R_2$ is linoleoyl group and P is trityl group or trialkylsilyl group.

MODE FOR INVENTION

A more complete appreciation of the invention, and many of the attendant advantages thereof, will be better appreciated by reference to the following detailed description.

In the preparation of 1-$R_1$-2-$R_2$-3-acetyl-glycerol derivative of Formula 1, this invention prevents a functional group from migrating by simultaneously carrying out the deprotection reaction and the acetylation reaction after introducing a protecting group into a reaction intermediate. The process for the regioselective preparation of 1-$R_1$-2-$R_2$-3-acetyl-glycerol derivative of Formula 1 according to this invention is shown in the following Reaction 1.

[Reaction 1]

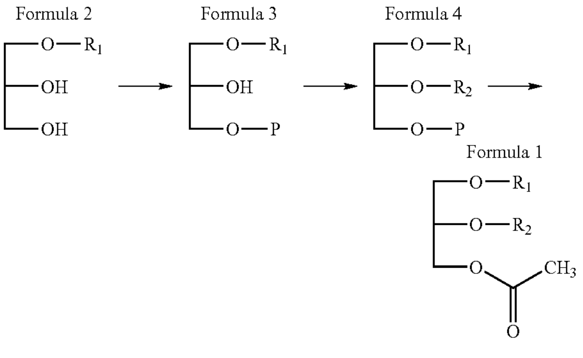

Formula 2
Formula 3
Formula 4
Formula 1

In Reaction 1, $R_1$ and $R_2$ are fatty acid groups having 16 to 22 carbon atoms, and are different from each other, and P is trityl group or trialkylsilyl group as a protecting group. The alkyl in trialkylsilyl group is alkyl group having 1 to 5 carbon atoms. The trityl group may be substituted or non-substituted trityl group, and the preferable example of trialkylsilyl group is t-butyldimethylsilyl group. The compounds shown in Reaction 1 can be racemic compounds or optically active compounds.

As shown in Reaction 1, in order to obtain 1-$R_1$-2-$R_2$-3-acetyl-glycerol derivative of Formula 1, first, 1-$R_1$-3-protecting group-glycerol of Formula 3 is obtained by introducing a protecting group (P) to 3-position of 1-$R_1$-glycerol of Formula 2. 1-$R_1$-glycerol of Formula 2, which is a starting material of Reaction 1, may be racemic 1-$R_1$-glycerol or optically active 1-$R_1$-glycerol.

The compound for introducing the protecting group should selectively protect a primary alcohol and the protecting group should not influence the acetylation reaction during the deprotection reaction thereof. Examples of the compound for introducing the protecting group include trityl chloride or t-butyldimethylsilyl chloride, and the preferable amount of the compound for introducing the protecting group is 1 to 1.1 equivalents with respect to 1-$R_1$-glycerol of Formula 2. If the amount of the compound for introducing the protecting group is less than 1 equivalent, the protecting reaction may be insufficiently carried out, and if the amount of the compound for introducing the protecting group is more than 1.1 equivalents, hydroxyl group at 2-position of glycerol derivative can be reacted.

When the protecting group is trityl group, 1-$R_1$-3-protecting group-glycerol of Formula 3 can be preferably obtained in the presence of pyridine solvent or in the presence of nonpolar aprotic organic solvent and organic base. When the pyridine solvent is used, the pyridine solvent works as a solvent and a base at the same time, and the preferable reaction temperature is 40~60° C. If the reaction temperature is less than 40° C., the reaction may be insufficiently carried out, and if the reaction temperature is more than 60° C., the trityl group may be introduced into 2-position of glycerol. The preferable amount of pyridine solvent is 5 to 10 equivalents with respect to 1-$R_1$-glycerol of Formula 2. When the organic solvent and organic base are used, the preferable reaction temperature is from 0° C. to room temperature. Examples of the nonpolar aprotic organic solvent include dichloromethane, tetrahydrofuran, ethyl acetate, and mixtures thereof, and examples of the organic base includes triethylamine, tributylamine, 1,8-diazabicyclo[5,4,0]-7-undecene (DBU) and mixtures thereof. The preferable amount of the organic base is 1 to 2 equivalents with respect to 1-$R_1$-glycerol of Formula 2, and the preferable amount of the organic solvent is 5 to 10 times by volume with respect to the weight of 1-$R_1$-glycerol of Formula 2 (i.e., 5~10 ml/g). When the amount of the pyridine solvent or the organic solvent is less than the above-mentioned range, the stirring of the reaction mixture may be difficult, and when the amount of the pyridine solvent or the organic solvent is more than the above-mentioned range, it is economically undesirable without additional advantage. In addition, when the amount of the organic base is less than 1 equivalent with respect to 1-$R_1$-glycerol, the reaction may be insufficiently carried out, and when the amount of the organic base is more than 2 equivalents, it is economically undesirable without additional advantage.

When the protecting group is trialkylsilyl group, for example, t-butyldimethylsilyl group, 1-$R_1$-3-protecting group-glycerol of Formula 3 can be preferably obtained in the presence of aprotic organic solvent and organic base, and at the temperature of from 0° C. to room temperature. Examples of the aprotic organic solvent include dichloromethane, tetrahydrofuran, ethyl acetate, dimethylformamide and mixtures thereof, and examples of the organic base include imidazole, triethylamine and the mixtures thereof. The preferable amount of the organic base is 1 to 2 equivalents with respect to 1-$R_1$-glycerol of Formula 2, and the preferable amount of the organic solvent is 5 to 10 times by volume with respect to the weight of 1-$R_1$-glycerol of Formula 2 (i.e., 5~10 ml/g). When the amount of the organic base is less than 1 equivalent with respect to 1-$R_1$-glycerol, the reaction may be insufficiently carried out, and when the amount of the organic base is more than 2 equivalents, it is economically undesirable without additional advantage. In addition, when the amount of the organic solvent is less than the above-mentioned range, the stirring of the reaction mixture may be difficult, and when the amount of the organic solvent is more than the above mentioned range, it is economically undesirable without additional advantage.

In 1-$R_1$-3-protecting group-glycerol of Formula 3, only the 2-position can participate in an additional esterification reaction. Therefore, $R_2$ group can be introduced by reacting $R_2$—OH with 1-$R_1$-3-protecting group-glycerol. Preferably, the reaction can be carried out in the presence of an aprotic organic solvent, a catalyst, and a water remover at the temperature of from 0° C. to room temperature. Examples of the aprotic organic solvent include hexane, heptane, dichloromethane, ethyl acetate, tetrahydrofuran and mixtures thereof, and example of the catalyst includes dimethylaminopyridine (DMAP). Example of the water remover includes dicyclohexylcarbodiimide (DCC). Alternatively, an activated compound of $R_2$ fatty acid can be used instead of $R_2$—OH, and examples of the activated compound include ester, amide and acid chloride of $R_2$ fatty acid.

When considering reactivity, easy purification, degree of purity and the color of the obtained 1-$R_1$-2-$R_2$-3-protecting group-glycerol of Formula 4, the combination of $R_2$—OH and dicyclohexylcarbodiimide (DCC) is more preferable. The preferable amount of DCC is 1 to 1.1 equivalents with respect to 1-$R_1$-3-protecting group-glycerol of Formula 3. When the amount of DCC is less than 1 equivalent, the reaction may be insufficiently carried out, and when the amount of DCC is more than 1.1 equivalents, it is economically undesirable without additional advantage. The reaction using dicyclohexylcarbodiimide (DCC) can be carried out in the aprotic organic solvents such as hexane, heptane, ethyl acetate, dichloromethane, tetrahydrofuran, and so on. However, for easy removal of the by-product of dicyclohexylurea, it is preferable to use hexane or heptane. The preferable amount of the organic solvent is 5 to 10 times by volume with respect to the weight of 1-$R_1$-3-protecting group-glycerol of Formula 3. Also, the preferable amount of dimethylaminopyridine (DMAP) is 0.5 to 1 mol % with respect to the mole of 1-$R_1$-3-protecting group-glycerol. When the amount of dimethylaminopyridine (DMAP) is less than 0.5 mol %, the reaction time may be prolonged, and when the amount of dimethylaminopyridine (DMAP) is more than 1 mol %, it is economically undesirable without additional advantage. The preferable amount of $R_2$ fatty acid or the activated compound of $R_2$ fatty acid (hereinafter, collectively, $R_2$ fatty acid) is 1 to 1.1 equivalents with respect to 1-$R_1$-3-protecting group-glycerol of Formula 3. When the amount of $R_2$ fatty acid less than 1 equivalent, the reaction can be insufficiently carried out, and when the amount of $R_2$ fatty acid is more than 1.1 equivalents, it is economically undesirable without additional advantage.

When the deprotection reaction is carried out, $R_2$ group at 2-position of deprotected 1-$R_1$-2-$R_2$-glycerol can be easily migrated to 3-position. In such case, a by-product is produced in the following acetylation reaction, and the by-product has a Rf (Rate of flow) value similar to that of the target product of Formula 1. Thus, the purification of 1-$R_1$-2-$R_2$-3-acetyl-glycerol of Formula 1 becomes difficult. To solve the above-mentioned problem, the deprotection reaction and the acetylation reaction are simultaneously carried out in the present invention. In case of using trityl group or trialkylsilyl group as the protecting group, the deprotection reaction and the acetylation reaction of 1-$R_1$-2-$R_2$-3-protecting group-glycerol of Formula 4 are carried out at the same time by using both of Lewis acid and acetic acid anhydride or by using an acetylation agent. Examples of the Lewis acid include Zinc Chloride ($ZnCl_2$), Tin Chloride ($SnCl_2$), boron trifluoride diethyl ether ($BF_3Et_2O$) and mixtures thereof, and examples of the acetylation agent include acetylchloride, acetylbromide and mixtures thereof. The preferable amount of Lewis acid is 1 to 5 equivalents with respect to 1-$R_1$-2-$R_2$-3-protecting group-glycerol of Formula 4. The preferable amount of acetic acid anhydride or the acetylation agent is 1 to 20 equivalents with respect to 1-$R_1$-2-$R_2$-3-protecting group-glycerol. When the amounts of Lewis acid, acetic acid anhydride and acetylation agent are less than the above-mentioned range, the reaction may be insufficiently carried out, and when the amounts of Lewis acid, acetic acid anhydride or the acetylation agent are more than the above-mentioned range, it is economically undesirable without additional advantage. The reaction can be carried out in the presence of an aprotic organic solvent, and the preferable amount of the organic solvent is 5 to 10 times by volume with respect to the weight of 1-$R_1$-2-$R_2$-3-protecting group-glycerol of Formula 4. Examples of the aprotic organic solvent include hexane, heptane, dichloromethane, toluene, ethyl acetate, acetonitrile and mixtures thereof. Alternatively, the reaction can be carried out in the absence of any solvent.

Also, in case of using trityl group as the protecting group, 1-$R_1$-2-$R_2$-3-protecting group-glycerol of Formula 4 can be deprotected and trialkylsilylated, for example, by using trimethylsilyliodide (TMSI). After the trialkylsilylation, the acetylation reaction can be carried out, for example, by using acetylchloride and Lewis acid which is selected from the group consisting of Zinc Chloride ($ZnCl_2$), Tin Chloride ($SnCl_2$), boron trifluoride diethyl ether ($BF_3Et_2O$) and mixtures thereof or by using acetylbromide alone. Namely, 1-$R_1$-2-$R_2$-3-acetyl-glycerol of Formula 1 can be obtained by the steps of (a) producing 1-$R_1$-2-$R_2$-3-trimethylsilyl-glycerol by using trimethylsilyliodide (TMSI) for deprotecting and trimethylsilylating 1-$R_1$-2-$R_2$-3-protecting group-glycerol of Formula 4, and (b) adding acetylchloride and Lewis acid or by adding acetylbromide. Trimethylsilyliodide (TMSI) can be used in a reagent form directly, or can be produced by the reactions of sodiumiodide/trimethylsilylchloride (NaI/TMSCl) or hexamethyldisilazane/iodine (HMDS/$I_2$) in the reaction solvent. 1-$R_1$-2-$R_2$-3-acetyl-glycerol of Formula 1 which is produced at the final step can be separated and purified with a column chromatography (hexane or heptane:ethyl acetate=36:1 by volume). The above-mentioned reaction may be carried out in the presence of an aprotic organic solvent which is selected from the group consisting of dichloromethane, ethyl acetate, acetonitrile and mixtures thereof. The preferable amount of the organic solvent is 5 to 10 times by volume with respect to the weight of 1-$R_1$-2-$R_2$-3-protecting group-glycerol of Formula 4. The preferable amounts of Lewis acid, trimethylsilyliodide (TMSI) and both of (namely, sum of) acetylchloride and acetylbromide are 1 to 5 equivalents, 1 to 5 equivalents and 1 to 20 equivalents with respect to 1-$R_1$-2-$R_2$-3-protecting group-glycerol of Formula 4, respectively. When the amounts of Lewis acid, trimethylsilyliodide (TMSI) and both of acetylchloride and acetylbromide are less than the above-mentioned range, the reaction may be insufficiently carried out, and when the amounts of Lewis acid, trimethylsilyliodide (TMSI) and both of acetylchloride and acetylbromide are more than the above-mentioned range, it is economically undesirable without additional advantage.

This invention also provides intermediates of the following Formula 3 and 4 for preparing glycerol derivative of Formula 1.

[Formula 3]

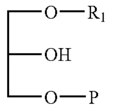

[Formula 4]

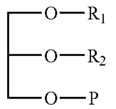

The compounds of Formula 3 and 4 are racemic compounds or optically active compounds, wherein $R_1$ and $R_2$ are fatty acid groups having 16 to 22 carbon atoms, and are different from each other. Preferably $R_1$ is palmitoyl group, and $R_2$ is linoleoyl group. P is trityl group or trialkylsilyl group as a protecting group, and the alkyl in trialkylsilyl group is alkyl group having 1 to 5 carbon atoms.

Hereinafter, the preferable examples are provided for better understanding of this invention. However, this invention is not limited by the following examples.

EXAMPLE 1

Preparation of 1-palmitoyl-3-trityl-glycerol 1-palmitoyl-glycerol (33.0 g), pyridine (48 ml) and trityl chloride (31.3 g) were added into 1 L reactor. The reaction mixture was heated to 60° C. while stirring, and the reaction was carried out for 3 hours. After completion of the reaction, cooled water (240 ml) was added slowly into the reaction mixture. The reaction mixture was further stirred for 1 hour, and then filtered. The obtained solid material was washed with cooled water (120 ml), and then dried at 40° C. to obtain 57.3 g of 1-palmitoyl-3-tritlyl-glycerol (yield: 100%) {$^1$H NMR (400 MHz, $CDCl_3$): δ 0.89-0.93 (t, 3H), 1.21-1.31 (m, 24H), 1.57-1.61 (m, 2H), 2.31 (t, 2H), 3.25 (d, 2H), 3.97-4.02 (m, 1H), 4.16-4.27 (m, 2H), 7.22-7.47 (m, 15H)}.

EXAMPLE 2

Preparation of 1-palmitoyl-3-t-butyldimethylsilyl-glycerol 1-palmitoyl-glycerol (33.0 g), dichloromethane (330 ml) and imidazole (13.6 g) were added into 1 L reactor, and the reaction mixture was cooled to 0° C. Then, t-butyl-dimethyl-silylchloride (18.0 g) was added, and the reaction mixture was stirred for 2 hours. After filtering the reaction mixture, the solvent was removed by distillation under reduced pressure, and purified water (165 ml) and heptane (150 ml) were added for an extraction. The separated organic layer was extracted with purified water (80 ml) again, and then the organic layer was dehydrated with anhydrous $MgSO_4$, and filtered. Then, the solvent was removed by distillation under reduced pressure to obtain 1-palmitoyl-3-t-butyldimethylsilyl-glycerol (yield: 100%) {$^1$H NMR (400 MHz, $CDCl_3$): δ 0.78-0.83 (m, 18H), 1.18-1.31 (m, 24H), 1.50-1.56 (m, 2H), 2.24 (t, 2H), 3.51-3.60 (m, 2H), 3.76-3.79 (p, 1H), 4.01-4.10 (m, 2H)}.

EXAMPLE 3

Preparation of 1-palmitoyl-2-linoleoyl-3-trityl-glycerol 1-palmitoyl-3-tritylglycerol (57.3 g), which was obtained in Example 1, heptane (300 ml), linoleic acid (29.4 g) and dimethylaminopyridine (0.122 g) were added into 1 L reactor. Dicyclohexylcarbodiimide (21.7 g) was added into the reactor, and then the reaction mixture was stirred for 3 hours at room temperature. Dicyclohexylurea was filtered to obtain heptane solution of 1-palmitoyl-2-linoleoyl-3-trityl-glycerol (expected yield: 100%) {$^1$H NMR (400 MHz, $CDCl_3$): δ 0.92-0.95 (m, 6H), 1.33-1.43 (m, 36H), 1.60 (m, 2H), 1.69 (m, 2H), 2.09-2.11 (m, 4H), 2.26 (t, 2H), 2.27 (t, 2H), 2.83 (t, 2H), 3.31 (m, 2H), 4.24-4.42 (m, 4H), 5.31-5.41 (m, 5H), 7.21-7.49 (m, 15H)}.

EXAMPLE 4

Preparation of 1-palmitoyl-2-linoleoyl-3-t-butyl-dimethylsilyl-glycerol 1-palmitoyl-3-t-butyldimethylsilyl-glycerol (44.4 g), which was obtained in Example 2, heptane (225 ml), linoleic acid (29.4 g) and dimethylaminopyridine (0.122 g) were added into 1 L reactor. Dicyclohexylcarbodiimide (21.7 g) was added into the reactor, and then the reaction mixture was stirred for 3 hours at room temperature. Dicyclohexylurea was filtered to obtain heptane solution of 1-palmitoyl-2-linoleoyl-3-t-butyl-dimethylsilyl-glycerol (expected yield: 100%) {$^1$H NMR (400 MHz, $CDCl_3$): δ 0.76-0.81 (m, 21H), 1.16-1.27 (m, 36H), 1.50-1.52 (m, 4H), 1.95 (q, 4H), 2.17-2.21 (m, 4H), 2.65 (t, 2H), 3.62 (d, 2H), 4.02-4.28 (m, 4H), 4.96-5.27 (m, 5H)}.

EXAMPLE 5

Preparation of 1-palmitoyl-2-linoleoyl-3-acetyl-glycerol

[Preparation Method-1]

The solvent of heptane solution of 1-palmitoyl-2-linoleoyl-3-trityl-glycerol, which was obtained in Example 3, was removed by distillation under reduced pressure, and then the residue was dissolved with acetonitrile (800 ml). Then, tin chloride (22 g) and acetic acid anhydride (206 ml) were added into the dissolved solution, and the dissolved solution was stirred for 24 hours at room temperature. After concentrating the reaction mixture, purified water (800 ml) and heptane (400 ml) were added for an extraction. The separated organic layer was washed with purified water (400 ml), and the washed organic layer was dehydrated with anhydrous $MgSO_4$, and filtered. 1-palmitoyl-2-linoleoyl-3-acetyl-glycerol (36.4 g) was obtained with a silica gel (Si-60, 230-400 mesh) column chromatography (heptane:ethyl acetate=36:1 by volume) (theoretical amounts: 63.5 g, yield: 57.4%) {$^1$H NMR (400 MHz, $CDCl_3$): δ 0.85-0.91 (m, 6H), 1.21-1.31 (m, 38H), 1.62 (m, 4H), 2.03 (m, 4H), 2.07 (s, 3H), 2.37 (m, 4H), 2.78 (m, 2H), 4.14-4.29 (m, 4H), 5.23-5.34 (m, 5H)}.

[Preparation Method-2]

Except for using boron trifluoride diethyl ether ($BF_3Et_2O$, 15.2 ml) instead of tin chloride (22 g) and stirring for 3 hours, 1-palmitoyl-2-linoleoyl-3-acetyl-glycerol (40.1 g) was obtained in the same manner as described in Preparation method-1 (theoretical amounts: 63.5 g, yield: 63.1%).

[Preparation Method-3]

The solvent of heptane solution of 1-palmitoyl-2-linoleoyl-3-trityl-glycerol, which was obtained in Example 3, was removed by distillation under reduced pressure. Then, acetylbromide (123 g) was added into the residue and stirred for 6 hours at room temperature. Heptane (400 ml) was added into the reaction mixture, the cooling purified water (400 ml) was dropwisely added thereto for extracting the organic layer. The separated organic layer was washed with a solution of saturated sodium bicarbonate (100 ml) and purified water (400 ml), and then the washed organic layer was dehydrated with anhydrous $MgSO_4$, and filtered. 1-palmitoyl-2-linoleoyl-3-acetyl-glycerol (46.7 g) was obtained with a silica gel (Si-60, 230-400 mesh) column chromatography(heptane: ethyl acetate=36:1 by volume) (theoretical amounts: 63.5 g, yield: 73.6%).

[Preparation Method-4]

Except that the solvent of heptane solution of 1-palmitoyl-2-linoleoyl-3-trityl-glycerol, which was obtained in Example 3, was not removed by distillation under reduced pressure, 1-palmitoyl-2-linoleoyl-3-acetyl-glycerol (43.0 g) was obtained in the same manner as described in Preparation method-3 (theoretical amounts: 63.5 g, yield: 67.7%).

[Preparation Method-5]

Except for using acetylchloride (157 g) instead of acetyl-bromide (123 g) and stirring for 12 hours, 1-palmitoyl-2-linoleoyl-3-acetyl-glycerol (26.3 g) was obtained in the same manner as described in Preparation method-3 (theoretical amounts: 63.5 g, yield: 41.4%).

[Preparation Method-6]

The solvent of heptane solution of 1-palmitoyl-2-linoleoyl-3-trityl-glycerol, which was obtained in Example 3, was removed by distillation under reduced pressure Then, acetonitrile (800 ml), sodium iodide (NaI, 74.9 g) and trimethylsilylchloride (TMSCl, 54.3 g) were added into the residue and stirred for 2 hours at room temperature. Anhydrous zinc chloride ($ZnCl_2$, 68.1 g) and acetylchloride (157 g) were added to the reaction mixture and stirred for 2 hours. The solvent of the reaction mixture was removed by distillation under reduced pressure, and heptane (400 ml) was added into the residue. The cooling purified water (400 ml) was dropwisely added thereto for extracting the organic layer. The separated organic layer was washed with a solution of saturated sodium bicarbonate (100 ml) and purified water (400 ml), and then the washed organic layer was dehydrated with anhydrous $MgSO_4$, and filtered. 1-palmitoyl-2-linoleoyl-3-acetyl-glycerol (33.3 g) was obtained with a silica gel (Si-60, 230-400 mesh) column chromatography(heptane:ethyl acetate=36:1 by volume) (theoretical amounts: 63.5 g, yield: 52.4%).

[Preparation Method-7]

Except for using acetylbromide (123 g) instead of both of anhydrous zinc chloride ($ZnCl_2$, 68.1 g) and acetylchloride (157 g) and stirring for 2 hours, 1-palmitoyl-2-linoleoyl-3-acetyl-glycerol (36.9 g) was obtained in the same manner as described in Preparation method-6 (theoretical amounts: 63.5 g, yield: 58.1%).

[Preparation Method-8]

Acetylbromide (123 g) was added into heptane solution of 1-palmitoyl-2-linoleoyl-3-t-butyl-dimethylsilyl-glycerol, which was obtained in Example 4, and the reaction mixture was stirred for 12 hours at room temperature. Heptane (400 ml) was added into the reaction mixture, and the cooling purified water (400 ml) was dropwisely added thereto for extracting the organic layer. The separated organic layer was washed with a solution of saturated sodium bicarbonate (100 ml) and purified water (400 ml), and then the washed organic layer was dehydrated with anhydrous $MgSO_4$, and filtered. 1-palmitoyl-2-linoleoyl-3-acetyl-glycerol (178 g) was obtained with a silica gel (Si-60, 230-400 mesh) column chromatography(heptane:ethyl acetate=36:1 by volume) (theoretical amounts: 63.5 g, yield: 28.0%).

[Preparation Method-9]

Except for using dichloromethane (50 ml), acetic aid anhydride (206 ml) and boron trifluoride diethyl ether ($BF_3.Et_2O$, 15.2 ml) instead of acetylbromide (123 g), 1-palmitoyl-2-linoleoyl-3-acetyl-glycerol (284 g) was obtained in the same manner as described in Preparation method-8 (theoretical amounts: 63.5 g, yield: 44.7%).

[Preparation Method-10]

By using optically active (R)-1-palmitoyl glycerol and optically active (S)-1-palmitoyl glycerol as the starting materials, and by carrying out Example 1 and Example 3, respectively, heptane solutions of (R)-1-palmitoyl-2-linoleoyl-3-tritylglycerol and (S)-1-palmitoyl-2-linoleoyl-3-tritylglycerol were obtained. Except for using the optically active compounds instead of racemic 1-palmitoyl-2-linoleoyl-3-trityl-glycerol, (S)-1-palmitoyl-2-linoleoyl-3-acetyl-glycerol (45.8 g) and (R)-1-palmitoyl-2-linoleoyl-3-acetyl-glycerol (45.8 g) were obtained in the same manner as described in Preparation method-3 (theoretical amounts: 63.5 g, yield: 72.1%). (R)-enantiomer: {$^1$H NMR (400 MHz, $CDCl_3$): δ 0.85-0.92 (m, 6H), 1.20-1.33 (m, 38H), 1.62 (m, 4H), 2.03 (m, 4H), 2.07 (s, 3H), 2.36 (m, 4H), 2.77 (m, 2H), 4.14-4.31 (m, 4H), 5.23-5.36 (m, 5H)}, (S)-enantiomer: {$^1$H NMR (400 MHz, $CDCl_3$): δ 0.85-0.92 (m, 6H), 1.21-1.33 (m, 38H), 1.63 (m, 4H), 2.02 (m, 4H), 2.07 (s, 3H), 2.37 (m, 4H), 2.78 (m, 2H), 4.12-4.28 (m, 4H), 5.21-5.35 (m, 5H)}.

INDUSTRIAL APPLICABILITY

As described above, the process for the regioselective preparation of glycerol derivatives and intermediates therefor according to this invention can produce glycerol derivative with a high efficiency and yield without the problem of migrating of a functional group. Also, in the process according to this invention, the purification step of using a silica gel column chromatography can be minimized.

The invention claimed is:

1. A process for the regioselective preparation of 1-$R_1$-2-$R_2$-3-acetyl-glycerol derivative of the following Formula 1 comprising the steps of:

obtaining 1-$R_1$-3-protecting group-glycerol of Formula 3 by introducing a protecting group to 3-position of 1-$R_1$-glycerol of Formula 2;

obtaining 1-$R_1$-2-$R_2$-3-protecting group-glycerol of Formula 4 by introducing $R_2$ group into 2-position of 1-$R_1$-3-protecting group-glycerol of Formula 3; and carrying out the deprotection reaction and the acetylation reaction of 1-$R_1$-2-$R_2$-3-protecting group-glycerol of Formula 4 at the same time,

[Formula 1]

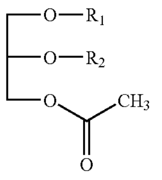

[Formula 2]

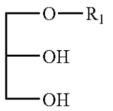

[Formula 3]

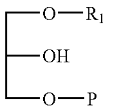

[Formula 4]

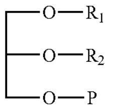

wherein, the compounds of Formula 1 to 4 are racemic compounds or optically active compounds; $R_1$ and $R_2$ are fatty acid groups having 16 to 22 carbon atoms, and are different from each other; and P is trityl group or trialkylsilyl group as the protecting group, and the alkyl in trialkylsilyl group is alkyl group having 1 to 5 carbon atoms.

2. The process for the regioselective preparation of glycerol derivative according to claim 1, wherein $R_1$ is palmitoyl group, $R_2$ is linoleoyl group and P is trityl group or t-butyldimethylsilyl group.

3. The process for the regioselective preparation of glycerol derivative according to claim 1, wherein the protecting group is trityl group, 1-$R_1$-3-protecting group-glycerol is obtained in the presence of pyridine solvent at the temperature 40-60.degree. C. or in the presence of nonpolar aprotic organic solvent and organic base at the temperature of 0.degree. C. to room temperature, the nonpolar aprotic organic solvent is selected from the group consisting of pyridine, dichloromethane, tetrahydrofuran, ethyl acetate, and mixtures thereof, and the organic base is selected from the group consisting of triethylamine, tributylamine, 1,8-diazabicyclo[5,4,0]-7-undecene (DBU) and mixtures thereof.

4. The process for the regioselective preparation of glycerol derivatives according to claim 3, wherein the amounts of pyridine and the organic base are 5 to 10 equivalents and 1 to 2 equivalents with respect to 1-$R_1$-glycerol respectively, the amount of the organic solvent is 5 to 10 times by volume with respect to the weight of 1-$R_1$-glycerol, and the amount of a compound for introducing the trityl group is 1 to 1.1 equivalents with respect to 1-$R_1$-glycerol.

5. The process for the regioselective preparation of glycerol derivatives according to claim 1, wherein the protecting group is trialkylsilyl group, 1-$R_1$-3-protecting group-glycerol is obtained in the presence of aprotic organic solvent and organic base, and at the temperature of from 0.degree. C. to room temperature, the aprotic organic solvent is selected from the group consisting of dichloromethane, tetrahydrofuran, ethyl acetate, dimethylformamide and mixtures thereof, and the organic base is selected from the group consisting of imidazole, triethylamine and the mixtures thereof.

6. The process for the regioselective preparation of glycerol derivatives according to claim 5, wherein the amount of the organic base is 1 to 2 equivalents with respect to 1-$R_1$-glycerol, the amount of the organic solvent is 5 to 10 times by volume with respect to the weight of 1-$R_1$-glycerol, and the amount of a compound for introducing the trialkylsilyl group is 1 to 1.1 equivalents with respect to 1-$R_1$-glycerol.

7. The process for the regioselective preparation of glycerol derivative according to claim 1, wherein the R.sub.$_2$ group is introduced by reacting $R_2$—OH with 1-$R_1$-3-protecting group-glycerol in the presence of an aprotic organic solvent, a catalyst, and a water remover, the aprotic organic solvent is selected from the group consisting of hexane, heptane, dichloromethane, ethyl acetate, tetrahydrofuran and mixtures thereof, and the catalyst is dimethylaminopyridine, and the water remover is dicyclohexylcarbodiimide.

8. The process for the regioselective preparation of glycerol derivatives according to claim 1, wherein the deprotection reaction and the acetylation reaction are carried out by using both of Lewis acid and acetic acid anhydride or by using an acetylation agent, the Lewis acid is selected from the group consisting of zinc chloride ($ZnCl_2$), tin chloride ($SnCl_2$), boron trifluoride diethyl ether ($BF_3Et_2O$) and mixtures thereof, and the acetylation agent is selected from the group consisting of acetylchloride, acetylbromide and mixtures thereof.

9. The process for the regioselective preparation of glycerol derivative according to claim 8, wherein the deprotection reaction and the acetylation reaction are carried out in the presence or absence of an aprotic organic solvent which is selected from the group consisting of hexane, heptane, dichloromethane, toluene, ethyl acetate, acetonitrile and mixtures thereof.

10. The process for the regioselective preparation of glycerol derivatives according to claim 8, wherein the amount of Lewis acid is 1 to 5 equivalents, and the amount of acetic acid anhydride or the acetylation agent is 1 to 20 equivalents with respect to 1-$R_1$-2-$R_2$-3-protecting group-glycerol.

11. The process for the regioselective preparation of glycerol derivatives according to claim 1, wherein the protecting group is trityl group, 1-$R_1$-2-$R_2$-3-protecting group-glycerol is deprotected and trialkylsilylated, and then the acetylation reaction is carried out by using acetylchloride and Lewis acid which is selected from the group consisting of zinc chloride ($ZnCl_2$), tin chloride ($SnCl_2$), boron trifluoride diethyl ether ($BF_3Et_2O$) and mixtures thereof or by using acetylbromide alone.

12. The process for the regioselective preparation of glycerol derivatives according to claim 11, wherein 1-$R_1$-2-$R_2$-3-protecting group-glycerol is deprotected and trialkylsilylated in the presence of an aprotic organic solvent which is selected from the group consisting of dichloromethane, ethyl acetate, acetonitrile and mixtures thereof.

13. The process for the regioselective preparation of glycerol derivatives according to claim 11, wherein 1-$R_1$-2-$R_2$-3-protecting group-glycerol is deprotected and trialkylsilylated by using trimethylsilyliodide, the amounts of Lewis acid, trimethylsilyliodide and both of acetylchloride and acetylbromide are 1 to 5 equivalents, 1 to 5 equivalents and 1 to 20 equivalents with respect to 1-$R_1$-2-$R_2$-3-protecting group -glycerol, respectively.

14. The process for the regioselective preparation of glycerol derivative according to claim 12, wherein the amount of the organic solvent is 5 to 10 times by volume with respect to the weight of 1-$R_1$-2-$R_2$-3-protecting group-glycerol.

15. An intermediate of the following Formula 3 for preparing glycerol derivative,

[Formula 3]

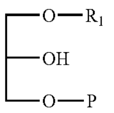

wherein the compound of Formula 3 is a racemic compound or an optically active compound, $R_1$ is fatty acid group having 16 to 22 carbon atoms, P is trityl group.

16. An intermediate of the following Formula 4 for preparing glycerol derivative,

[Formula 4]

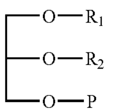

wherein the compound of Formula 4 are a racemic compound or an optically active compound; $R_1$ and $R_2$ are fatty acid groups having 16 to 22 carbon atoms, and are different from each other; P is trityl group.

* * * * *